(12) United States Patent
Kalms et al.

(10) Patent No.: US 7,191,276 B2
(45) Date of Patent: Mar. 13, 2007

(54) HUB CHIP FOR ONE OR MORE MEMORY MODULES

(75) Inventors: Sven Kalms, München (DE); Helmut Kandolf, München (DE)

(73) Assignee: Infineon Technologies AG, Munich (DE)

( * ) Notice: Subject to any disclaimer, the term of this patent is extended or adjusted under 35 U.S.C. 154(b) by 259 days.

(21) Appl. No.: 10/877,139

(22) Filed: Jun. 25, 2004

(65) Prior Publication Data

US 2005/0027923 A1 Feb. 3, 2005

(30) Foreign Application Priority Data

Jun. 26, 2003 (DE) ................. 103 28 658

(51) Int. Cl.
*G06F 13/36* (2006.01)
(52) U.S. Cl. .................. 710/306; 710/305; 710/100
(58) Field of Classification Search ........ 710/305–306, 710/100
See application file for complete search history.

(56) References Cited

U.S. PATENT DOCUMENTS

| 6,477,592 | B1* | 11/2002 | Chen et al. ............ 710/52 |
| 2002/0038405 | A1 | 3/2002 | Leddige et al. |
| 2003/0057994 | A1 | 3/2003 | Braun et al. |
| 2004/0044833 | A1* | 3/2004 | Ryan ............ 711/5 |
| 2004/0044857 | A1* | 3/2004 | Jeddeloh et al. ........... 711/154 |
| 2004/0260859 | A1 | 12/2004 | Park et al. |

FOREIGN PATENT DOCUMENTS

| DE | 10121902 A1 | 12/2001 |
| DE | 691 32 721 | 5/2002 |
| DE | 10146491 A1 | 4/2003 |
| WO | WO 91/16680 | 10/1991 |

OTHER PUBLICATIONS

German Patent Office Examination Report dated Apr. 29, 2004.
German Patent Office Examination Report dated Jul. 28, 2005.
German Examination Report Dated Apr. 29, 2004.
German Patent Office Examination Report dated Nov. 9, 2005.

\* cited by examiner

*Primary Examiner*—Rehana Perveen
*Assistant Examiner*—Kim T. Huynh
(74) *Attorney, Agent, or Firm*—Patterson & Sheridan, L.L.P.

(57) ABSTRACT

One embodiment of the invention provides a hub chip comprising: an address bus input for receiving a plurality of successively sent portions of address and/or command data, a shift register which has register elements and is connected to the address bus input to receive the plurality of portions of the address and/or command data, the shift register being connected to the address bus input so that, when the address and/or command data are received, the portions of the address and/or command data are successively written to the register elements, an address bus output for outputting the received address and/or command data, a memory module interface for connecting one or more memory modules, where the hub chip addresses none, one or a plurality of the connected memory modules, depending on the address and/or command data transferred, and a driver element provided to output the received portion of the address and/or command data to the address bus output before all of the portions of the address and/or command data have been received in full.

18 Claims, 2 Drawing Sheets

HUB CHIP FOR ONE OR MORE MEMORY MODULES

CROSS-REFERENCE TO RELATED APPLICATIONS

This application claims foreign priority benefits under 35 U.S.C. §119 to co-pending German patent application number 103 28 658.6-53, filed Jun. 26, 2003. This related patent application is herein incorporated by reference in its entirety.

BACKGROUND OF THE INVENTION

1. Field of the Invention

The invention relates to a hub chip for connection to an address bus and for connecting one or more memory modules.

2. Description of the Related Art

Memory modules are frequently used in personal computers in order to store data which can be processed in the personal computer. In order to use the storage capacity of a plurality of memory modules, an address and databus is usually provided which has the memory modules connected to it, i.e., each of the memory modules is connected to the joint address and databus. The line and input capacitances of the corresponding inputs for the address and databus on the memory modules and also reflection of the signals at branch points mean that the maximum clock frequency at which address data and user data can be transferred is limited.

Particularly when double data rate (DDR) technology is used, the frequencies at which data are transferred via the address and databus can be very high. For future DDR-III technology, it is therefore appropriate for the memory modules not to be operated on a joint address and databus.

One possible alternative address and databus concept involves the provision of a "hub chip" between memory modules and memory controller, which is used to actuate one or more memory modules. The hub chip is connected to the memory controller, which controls the storage and retrieval of data. The hub chip has an input for the address and databus in order to receive address data and user data and to transfer any user data to the memory controller. The hub chip also has an output which can be used to output address and user data. The output for the address data and user data can be connected to an input on a further hub chip downstream.

Normally, address data in the currently used DDR-II and the future DDR-III technology are transferred not in parallel, but rather in blocks, e.g., four blocks, which means that the full address data are available in the appropriately connected hub chip only after four clock cycles. So that the hub chip detects whether one of the memory modules connected to it is being addressed by the address data item, it is first necessary to receive all portions of the address data before a decision can be made regarding whether one of the memory modules connected to the hub chip is being addressed by the address.

To date, provision has been made for the address data to be forwarded to the next connected hub chip only after the address data have been received in full. This is usually done using a shift register to which the portions of the address data are successively written, the portions being pushed into the shift register and being forwarded at the end of the shift register via the output of the hub chip to the input of the next hub chip (if present). With a plurality of hub chips connected in succession, this results in the address data being applied to the input of the respective hub chip with a delay. The delay in the address data becomes greater for a hub chip the more hub chips there are in the array upstream of the hub chip in question. This results in an unwanted delay in the addressing of one of the memory modules on hub chips situated further back in the array when there are a plurality of hub chips connected in succession.

SUMMARY OF THE INVENTION

It is therefore an object of the present invention to provide a hub chip in which the address data are delayed as little as possible in order to provide the address data for the subsequent hub chips more quickly.

One embodiment of the invention provides a hub chip for connection to an address bus and for connecting one or more memory modules. The hub chip has an address bus input for receiving a plurality of successively sent portions of address and/or command data. The hub chip also has a shift register which comprises register elements and is connected to the address bus input to receive the plurality of portions of the address and/or command data via the address bus. The shift register is connected to the address bus input so that, when the address and/or command data are received, the portions of the address and/or command data can be successively written to the register elements. The hub chip also has an address bus output for outputting the address and/or command data received via the address bus input. The hub chip also comprises a memory module interface for connecting one or more memory modules. The hub chip addresses none, one or a plurality of the connected memory modules, depending on the address and/or command data transferred and received. A driver element is provided to output the received portion of the address and/or command data to the address bus output before all of the portions of the address and/or command data have been received in full.

The effect achieved by this is that each portion of the address and/or command data is applied to the address bus output essentially directly, i.e., immediately or upon the next relevant clock edge, so that the next hub chip in the array receives the address and/or command data after a very short delay time. Another advantage is that the driver element amplifies the address and/or command data, which means that these data can be driven to the address bus input of a subsequent hub chip via the address bus at a high clock rate which is required for DDR technology.

Provision may be made for the driver element to output the received portions of the address and/or command data directly to the address bus output, for the address and/or command data to be applied to the output of the hub chip, after a delay time in the driver element. In order to achieve a defined time reference for the address data at the inputs of hub chips which are connected in succession, provision may be made for the driver element to output the received portions of the address and/or command data to the address bus output on the basis of a clock signal.

Provision may also be made for the register elements to comprise a first register element and a second register element. The register elements are connected to the address bus input so as to receive the received portions of the address and/or command data in the first register element first. The driver element is contained in the first register element, which means that, after the received portion of the address and/or command data has been accepted, the corresponding portion of the address and/or command data is applied to the address bus output. In this way, the driver element can be designed to be integrated in the register element. The register element may be in the form of a latch in which an applied data item is stored in the latch upon one edge of the clock signal and is simultaneously applied to an output on the latch. In this way, suitable dimensions for the register element at the output of the register element make it possible to apply that portion of the address and/or command data which has just been received to the address bus output of the hub chip.

BRIEF DESCRIPTION OF THE DRAWINGS

Preferred embodiments of the invention are explained in more detail below with reference to the appended drawings, in which.

DETAILED DESCRIPTION OF THE PREFERRED EMBODIMENT

Figure 1:
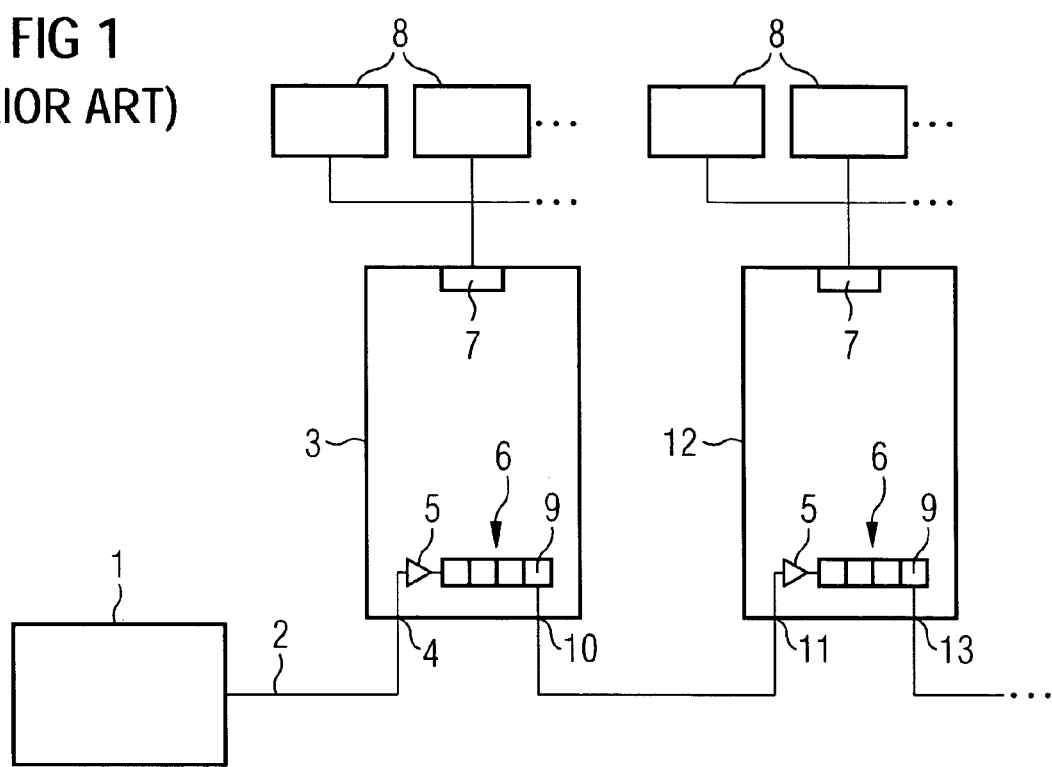
FIG. 1 shows a block diagram of a memory system with hub chips based on the prior art.

FIG. 1 shows a memory system with a memory controller 1 which is connected to a first hub chip 3 by means of an address bus 2. The address bus 2 is connected to a first driver element 5 by means of an address bus input 4 on the first hub chip 3 to receive and amplify the address data on the address bus 2 such that the address data can be written to the shift register 6. For the sake of clarity, a databus routed parallel to the address bus 2 for transferring user data to the hub chips is not shown. The first hub chip 3 has a memory module interface 7 to which one or more memory modules 8 can be connected. In line with the address data received via the address bus 2, either none, one or a plurality of the memory modules 8 connected to the first hub chip 3 is addressed.

In the case of DDR technology, the address data are normally transferred in a plurality of portions, which means that the address bus width can be reduced. Provision may thus be made, by way of example, for the 32-bit address data to be transferred successively in portions of 1 byte (=8 bits) each. The successively transferred portions of the address data item are first written to the shift register 6, which may likewise have four register elements 9, with a data width of 8 bits. When the first portion of the address data has been received, the first hub chip 3 is able to detect whether one of the memory modules 8 which are connected to its memory module interface 7 is being addressed using the address data item.

The last register element in the shift register 6 is connected to a first address bus output 10 on the first hub chip 3. The address bus output 10 of the first hub chip 3 is connected to a second address bus input 11 on a second hub chip 12 by means of a further address bus section. The second hub chip 12 has a second address bus output 13, which can likewise be connected to a further address bus input on any downstream hub chips (not shown). Each of the hub chips 3, 12 has a driver element 5 and a shift register 6.

During transfer of the plurality of portions of the address bus data, the data are written successively to the shift register 6 and are shifted through successive register elements 9. Only when the first portion of the address data item has reached the last register element 9 in the shift register 6 is that portion of the address data item which was received first applied to the second hub chip 12 via the first address bus output 10. Hence, the second hub chip 12 is provided with the address data following a delay which becomes greater with more register elements 9 in the shift register 6.

Figure 2:
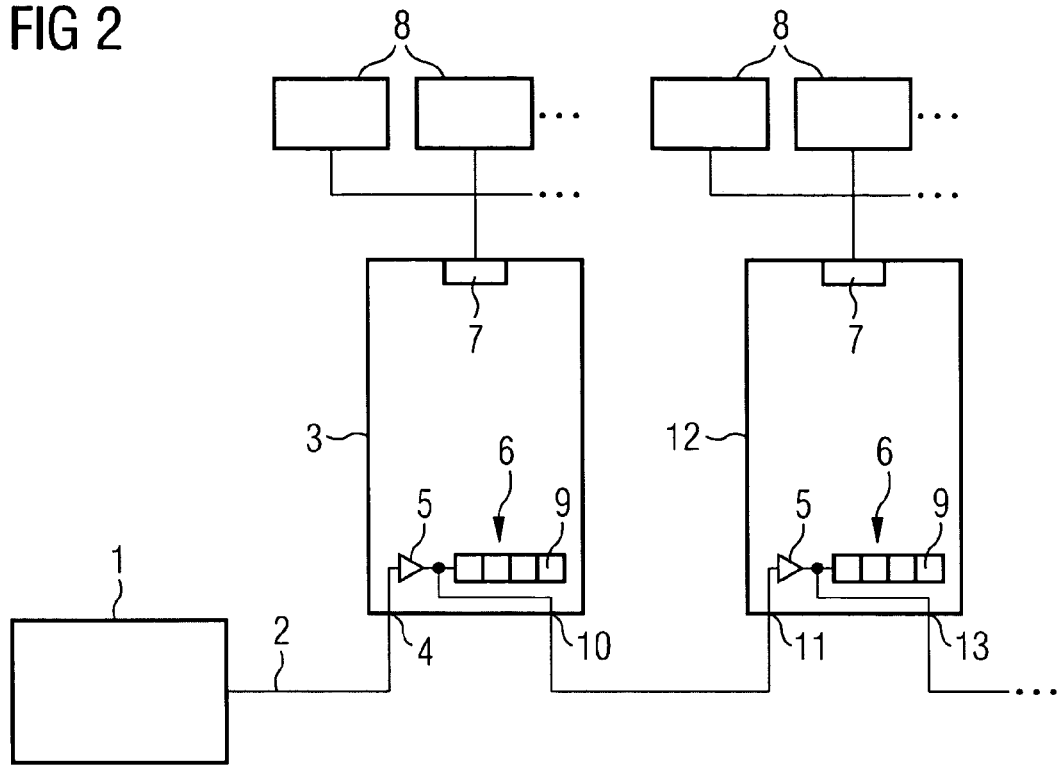
FIG. 2 shows a block diagram of a memory system based on a first embodiment of the invention.

FIG. 2 shows a memory system with hub chips based on a first embodiment of the invention. Identical reference numerals refer essentially to identical components of the memory system. One difference between the inventive hub chip and a hub chip based on the prior art is that the output of the driver element 5 is connected both to the first register element in the shift register 6 and to the address bus output 10, 13 of the respective hub chip 3, 12. This means that, as soon as the address data have been received by the first hub chip 3, the address data are applied to the address bus outputs 10, 13 of the respective hub chip 3, 12 after amplification by the driver elements 5. A delay in providing the address data portions does not arise in essence, since the portions of the address data are amplified merely by the driver element 5, which brings about only a slight signal delay.

The driver element 5 can forward the address data to the respective address bus output 10, 13 asynchronously or synchronously in line with a clock signal. The advantage of synchronous forwarding to the address bus output 10, 13 is that the time delay after which the address data item is applied to one of the next hub chips is defined.

Figure 3:
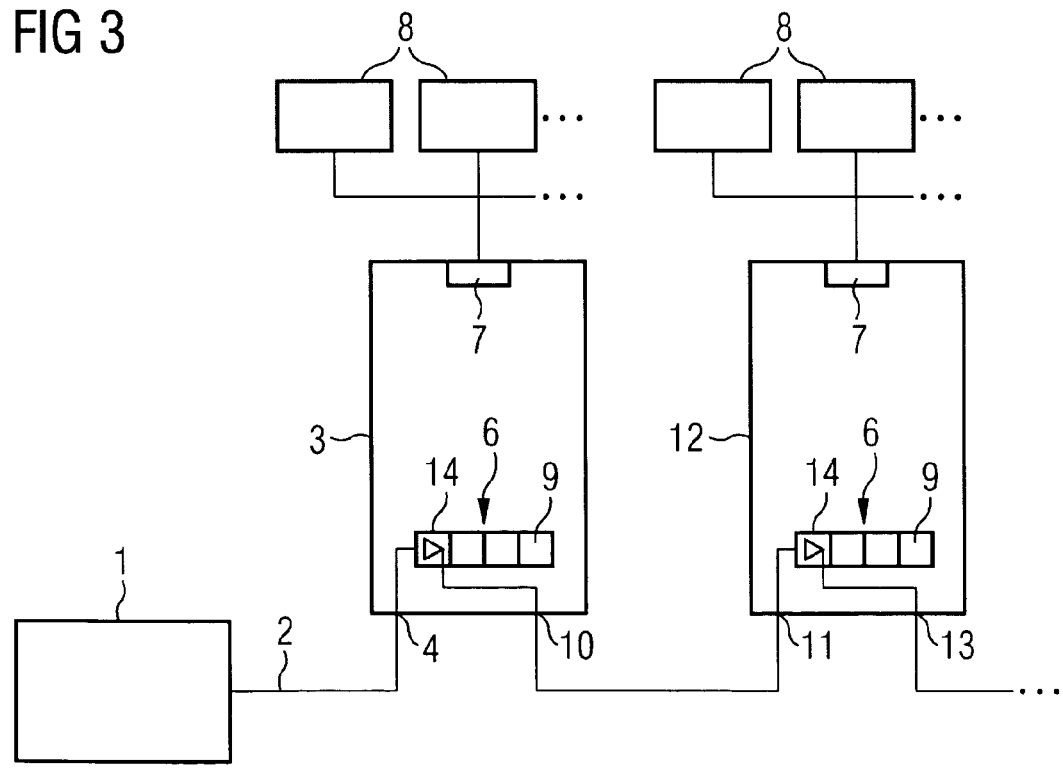
FIG. 3 shows a block diagram of a memory system with a hub chip based on a second embodiment of the invention.

FIG. 3 shows a memory system with hub chips based on a second embodiment of the invention. The driver element is integrated in a first register element 14 in the shift register 6, with the output of the first register element 14 being connected to the address bus output 10, 13 of the respective hub chip.

Shift registers 6 are generally designed as latches, the latches being connected in succession such that the output of one latch is connected to the input of the other latch. Latches have the function of transferring a data item which is applied to the input at the time of a clock edge to a memory and applying the content of the memory to the output of the latch. Normally, a latch has a flipflop for storing the data item in question.

The first register element may be proportioned such that it is able to store the respective data item even when a capacitive load has been applied to the output of the flipflop which is in the latch. The load may be defined by the line length of the connection between the address bus output and the address bus input of the next hub chip and also the input impedance of the first register element in the next hub chip. Normally, the portions of the address data are transferred to the register elements 9 in line with a clock signal. In this way, the first portion of the address data item is actually applied to the address bus output 10 of the first hub chip 3 after the first clock edge for transferring the first portion of the address data item, which means that the first portion of the address data item can be transferred to the first register element in the second hub chip 12 upon the next rising edge and, at the same time, the first portion of the address data item is applied to the second address bus output 13 of the second hub chip 12. In this way, there is just a short delay (e.g., one clock cycle) in providing an address data item in the hub chips. At the same time, the combination of the driver element with the first register element allows a saving on area requirement to be achieved for an integrated form of the hub chip based on the first embodiment (as shown in FIG. 2).

What is claimed is:

1. A hub chip for a memory system, comprising:
a data bus input for receiving data;
a driver element for amplifying the received data;
a register connected to an output of the driver element;

a data bus output connected to the output of the driver element; and a memory module interface for connecting to and addressing one or more memory modules based on the received data, wherein each of the address data and command data are received in a plurality of successive portions and wherein the driver element outputs one or more portions of received data before the plurality of successive portions is completely received.

2. The hub chip of claim 1, wherein the data bus input comprises an address bus input for receiving at least one of address data and command data and wherein the data bus output comprises an address bus output.

3. The hub chip of claim 1, wherein the driver element outputs each received portion of the data to the data bus output immediately after receiving each portion of the data.

4. The hub chip of claim 1, wherein the driver element outputs each received portion of the data to the data bus output based on a clock signal.

5. The hub chip of claim 1, wherein the register comprises a shift register having a plurality of register elements for receiving the address data and the command data, wherein the received data are successively written into the plurality of register elements.

6. The hub chip of claim 5, wherein the plurality of register elements comprise a first register element and a second register element and wherein the first register element contains the driver element.

7. The hub chip of claim 6, wherein the driver element outputs the received portions of the data to the data bus output based on a clock signal.

8. The hub chip of claim 1, wherein the data bus output is connectable to a subsequent data bus input of a subsequent hub chip.

9. A memory system, comprising:
a memory controller;
one or more hub chips, each hub chip comprising:
a data bus input for receiving data;
a driver element for amplifying the received data;
a register connected to an output of the driver element; and
a data bus output connected to the output of the driver element; and
one or more pluralities of memory modules connected to the one or more hub chips respectively;
wherein the data bus input of a first hub chip of the one or more hub chips is connected to the memory controller through a data bus and wherein the data bus input of each subsequent hub chip is connected to the data bus output of a respective previous hub chip.

10. The memory system of claim 9, wherein the data bus input comprises an address bus input for receiving at least one of address data and command data, wherein the data bus output comprises an address bus output, wherein each of the address data and command data are received in a plurality of successive portions and wherein the driver element outputs one or more portions of received data before the plurality of successive portions is completely received.

11. The memory system of claim 10, wherein the driver element outputs each received portion of the data to the data bus output immediately after receiving each portion of the data.

12. The memory system of claim 10, wherein the driver element outputs each received portion of the data to the data bus output based on a clock signal.

13. The memory system of claim 10, wherein the register comprises a shift register having a plurality of register elements for receiving the address data and the command data, wherein the received data are successively written into the plurality of register elements, wherein the plurality of register elements comprise a first register element and a second register element and wherein the first register element contains the driver element.

14. The memory system of claim 13, wherein the driver element outputs the received portions of the data to the bus output based on a clock signal.

15. A hub chip for a memory system having a memory controller and a plurality of memory modules connected to the hub chip, comprising:
a bus input means for receiving data in a plurality of successive portions;
a driver means for amplifying the received data;
a register means, connected to an output of the driver element, for storing the received data; and
a bus output means, connected to the output of the driver element, for outputting received data to a subsequent data bus input of a subsequent hub chip, wherein the driver means outputs each received portion of the data to the bus output means immediately after receiving each portion of the data.

16. The hub chip of claim 15, wherein the driver means outputs each received portion of the data to the bus output means based on a clock signal.

17. The hub chip of claim 15, wherein the register means comprises a shift register having a plurality of register elements for receiving data, wherein the received data are successively written into the plurality of register elements, wherein the plurality of register elements comprise a first register element and a second register element and wherein the first register element contains the driver means.

18. The hub chip of claim 17, wherein the driver means outputs the received portions of the data to the bus output means based on a clock signal.

* * * * *